United States Patent
Jauh et al.

(10) Patent No.: US 10,104,676 B2
(45) Date of Patent: Oct. 16, 2018

(54) GAINING AN MU-TXOP FOR TRANSMITTING PACKET USING OFDMA

(71) Applicant: MEDIATEK INC., Hsinchu (TW)

(72) Inventors: Yuh-Ren Jauh, Taoyuan (TW);
Ching-Hwa Yu, Tainan (TW);
Chao-Chun Wang, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 51 days.

(21) Appl. No.: 15/145,309

(22) Filed: May 3, 2016

(65) Prior Publication Data

US 2016/0330753 A1 Nov. 10, 2016

Related U.S. Application Data

(60) Provisional application No. 62/156,414, filed on May 4, 2015.

(51) Int. Cl.
| | |
|---|---|
| *H04W 72/10* | (2009.01) |
| *H04L 5/00* | (2006.01) |
| *H04W 72/04* | (2009.01) |
| *H04W 74/08* | (2009.01) |
| *H04W 28/06* | (2009.01) |
| *H04W 88/08* | (2009.01) |
| *H04W 84/12* | (2009.01) |

(52) U.S. Cl.
CPC .......... *H04W 72/10* (2013.01); *H04L 5/0007* (2013.01); *H04W 28/065* (2013.01); *H04W 72/044* (2013.01); *H04W 74/0866* (2013.01); *H04W 84/12* (2013.01); *H04W 88/08* (2013.01)

(58) Field of Classification Search
CPC ............... H04W 72/10; H04W 72/044; H04W 74/0866; H04W 28/065; H04W 88/08; H04W 84/12; H04L 5/0007
See application file for complete search history.

(56) References Cited

U.S. PATENT DOCUMENTS

| | | | |
|---|---|---|---|
| 7,974,250 B2 * | 7/2011 | Jang ................... | H04W 52/0216 370/311 |
| 2010/0157962 A1 | 6/2010 | Koo et al. ..................... | 370/338 |
| 2012/0008490 A1 | 1/2012 | Zhu ............................... | 370/216 |
| 2012/0140615 A1 | 6/2012 | Gong ............................ | 370/216 |
| 2015/0124689 A1 * | 5/2015 | Merlin .................. | H04L 5/0055 370/312 |

OTHER PUBLICATIONS

EPO, Search Report for the EP patent application 16168393.3 dated Sep. 5, 2016 (7 pages).

* cited by examiner

*Primary Examiner* — Omar J Ghowrwal

(57) ABSTRACT

A method of performing OFDMA transmission with aggregation from multiple access categories to improve channel utilization of a wireless channel is proposed. In one novel aspect, data from multiple access categories are allowed to be aggregated and transmitted in the same packet to utilize idle time efficiently. In downlink OFDMA, AP can send different AC data to different STAs so that AP can better arrange the transmission resource block. If the resource for one STA has long enough idle time, AP can aggregate more data that is different to the current AC for the same STA to better utilize the resource. In UL OFDMA, different STAs can send different AC data to AP. If the resource for one STA has long enough idle time, the STA can aggregate more data that is different to the current AC to better utilize the resource.

18 Claims, 5 Drawing Sheets

GAINING AN MU-TXOP FOR TRANSMITTING PACKET USING OFDMA

CROSS REFERENCE TO RELATED APPLICATIONS

This application claims priority under 35 U.S.C. § 119 from U.S. Provisional Application No. 62/156,414, entitled "CONTENTION BASED UPLINK OFDMA," filed on May 4, 2015, the subject matter of which is incorporated herein by reference.

TECHNICAL FIELD

The disclosed embodiments relate generally to wireless communication, and, more particularly, to contention based uplink OFDMA.

BACKGROUND

IEEE 802.11 is a set of media access control (MAC) and physical layer (PHY) specification for implementing wireless local area network (WLAN) communication in the WI-FI (2.4, 3.6, 5, and 60 GHz) frequency bands. The 802.11 family consists of a series of half-duplex over-the-air modulation techniques that use the same basic protocol. The standards and amendments provide the basis for wireless network products using the WI-FI frequency bands. For example, IEEE 802.11ac is a wireless networking standard in the IEEE 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

In IEEE 802.11ac, a transmitter of a BSS (basic service set) of certain bandwidth is allowed to transmit radio signals onto the shared wireless medium depending on clear channel assessment (CCA) sensing and a deferral or backoff procedure for channel access contention. An enhanced distributed channel access (EDCA) protocol is used in IEEE 802.11ac as a channel contention procedure for wireless devices to gain access to the shared wireless medium, e.g., to obtain a transmitting opportunity (TXOP) for transmitting radio signals onto the shared wireless medium.

With EDCA, high-priority traffic has a higher chance of being sent than low-priority traffic. A station with high priority traffic waits a little less before it sends its packet than a station with low priority traffic. The levels of priority in EDCA are called access categories (ACs). For example, ACs map directly from Ethernet-level class of service (CoS) priority levels indicated via a priority code point (PCP) associated with a traffic type, e.g. a traffic ID. The EDCA parameters for each AC are set differently according to the traffic type. The traffic in different ACs cannot be sent in the same packet for contention fairness consideration. In legacy WLAN, different AC traffic cannot be transmitted in an A-MPDU for contention fairness consideration.

Orthogonal frequency division multiple access (OFDMA) technology is developed in the cellular network enabling multiple users sharing the same wideband at the same time. How to adapt the OFDMA technology to the WLAN to enable multiple users sharing the same wideband remains a question. In OFDMA wireless systems, contention-based uplink transmission is commonly used for multiple user equipments (UEs) to transmit uplink data to a serving base station via a shared uplink channel. For example, an STA may request access and acquire ownership of an uplink channel to initiate transmission. Therefore, in WLAN, contention-based random access can also be used for uplink OFDMA operation.

In OFDMA, the air time of scheduled DL/UL OFDMA resource unit (RU) is limited by the STA that requires the longest air time. The condition of fairness consideration is totally different as compared to legacy WLAN. Other STAs may have long idle time. It is desirable to utilize the idle time efficiently. Furthermore, for downlink or uplink (DL/UL) OFDMA, to align the timing for all the multi-user transmission, idle time may be introduced for some DL/UL resource units (RUs) and padding may be required. Further improvements on utilization of resource unit (RUs) is also desired.

SUMMARY

A method of performing OFDMA transmission with aggregation from multiple access categories to improve channel utilization of a wireless channel is proposed. In one novel aspect, data from multiple access categories are allowed to be aggregated and transmitted in the same packet to utilize idle time efficiently. In downlink OFDMA, AP can send different AC data to different STAs so that AP can better arrange the transmission resource block. If the resource for one STA has long enough idle time, AP can aggregate more data that is different to the current AC for the same STA to better utilize the resource. In UL OFDMA, different STAs can send different AC data to AP. If the resource for one STA has long enough idle time, the STA can aggregate more data that is different to the current AC to better utilize the resource.

In one embodiment, a transmitting wireless communication station waits for an indication to transmit an aggregated frame to a receiving wireless communication station in a wireless communication network. The indication is selected from the group consisting of the wireless channel is idle for a predetermined amount of time, an internal timer expired, and a trigger frame is received from the receiving wireless communication station indicating when to transmit the aggregated frame. In other embodiments, the indication can be decided by combining two or all of the indications listed. The transmitting wireless communication station aggregates data from multiple queues associated with different access categories and forming the aggregated frame. Each access category is associated with a traffic type of the data. The transmitting wireless communication station transmits the aggregated frame to the receiving wireless communication station upon obtaining the indication.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
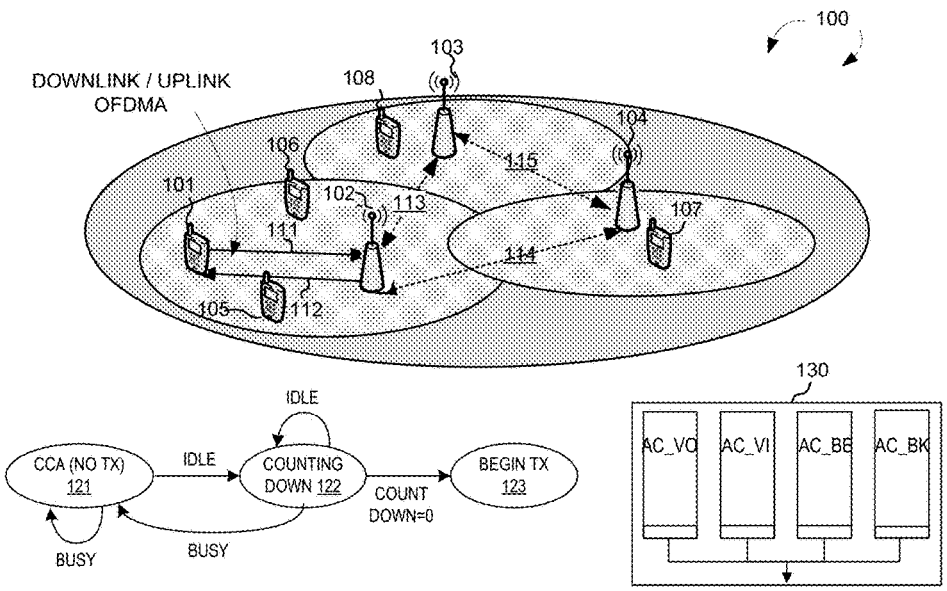
FIG. 1 illustrates an exemplary wireless system supporting OFDMA with aggregating data having different access categories in accordance with embodiments of the current invention.

FIG. 1 illustrates an exemplary wireless system 100 supporting orthogonal frequency division multiple access (OFDMA) with aggregating data having different access categories in accordance with embodiments of the current invention. Wireless communication system 100 includes one or more wireless communication networks, each wireless communication network has a fixed base infrastructure unit, such as wireless communication stations 102 103, and 104, forming wireless networks distributed over a geographical region. The base unit may also be referred to as an access point, an access terminal, a wireless communication station, a Node-B, an eNode-B, or by other terminology used in the art. Each of the wireless communication stations 102, 103, and 104 serves a geographic area. Backhaul connections 113, 114 and 115 interconnect the non-co-located wireless communication stations with each other. These backhaul connections can be either ideal or non-ideal.

A wireless communication device (STA) 101 in wireless network 100 is served by wireless communication station 102 via uplink 111 and downlink 112. Other wireless communication devices (STAs) 105, 106, 107, and 108 are served by different wireless communication stations. STAs 105 and 106 are served by wireless communication station 102. STA 107 is served by wireless communication station 104. STA 108 is served by wireless communication station 103. In one embodiment, wireless communication network 100 is an OFDMA system comprising wireless communication stations/access points (APs) 102, 103 and 104, and a plurality of wireless communication devices, such as wireless devices (STAs) 101, 105, 106, 107 and 108. In the applications, each wireless communication station serves multiple wireless communication devices that transmit and receive packets using uplink and downlink OFDMA, respectively.

In IEEE 802.11, a transmitter of a BSS (basic service set) of certain bandwidth is allowed to transmit radio signals onto the shared wireless medium depending on clear channel assessment (CCA) sensing and a deferral or backoff procedure for channel access contention. An enhanced distributed channel access (EDCA) protocol is used in IEEE 802.11ac as a channel contention procedure for wireless devices to gain access to the shared wireless medium, e.g., to obtain a transmitting opportunity (TXOP) for transmitting radio signals onto the shared wireless medium. With EDCA, high-priority traffic has a higher chance of being sent than low-priority traffic. The levels of priority in EDCA are called access categories (ACs). For example, ACs map directly from Ethernet-level class of service (CoS) priority levels indicated via a priority code point (PCP) associated with a data traffic type. The EDCA parameters for each AC are set differently according to the data traffic type.

In the example of FIG. 1, a transmitting station starts with CCA and generates a CCA status (step 121). If the channel is idle, then the station starts counting down (step 122), which is called the random backoff. During the counting down, the station keeps performing the CCA process and updates the CCA status. When the counting down reaches zero, the station gains access and begins transmission over the wireless channel. The EDCA procedure is associated with a set of EDCA parameters. Different parameters are assigned to different access categories for channel contention to provide quality of service (QoS) of different data traffic types. More specifically, each traffic type or traffic ID is assigned with a separate AC queue for storing data with the corresponding traffic type/AC. For example, as depicted by box 130, four AC queues (AC_VO, AC_VI, AC_BE, and AC_BK) are used for storing data with the corresponding traffic type. In legacy WLAN, data in different AC queues cannot be sent in the same packet for contention fairness consideration.

In OFDMA, the air time is limited by the station that has the maximum air time requirement. The condition of fairness consideration is totally different. Other STAs may have long idle time. In one novel aspect, data from multiple access categories are allowed to be aggregated and transmitted in the same packet to utilize idle time efficiently. In downlink OFDMA, AP can send different AC data to different STAs so that AP can better arrange the transmission resource block. If the resource for one STA has long enough idle time, AP can aggregate more data that is different to current AC for the same STA to better utilize the resource. Also, in downlink OFDMA, data to multiple destinations are allowed to be aggregated and transmitted in the same packet to utilize idle time efficiently. In UL OFDMA, different STAs can send different AC data to AP. If the resource for one STA has long enough idle time, the STA can aggregate more data that is different to the current AC to better utilize the resource. A contention-based uplink OFDMA transmission scheme can also be used. AP reserves both dedicated resource and contention resource for uplink OFDMA operation. AP only needs to specify the allocated resource for random access and the uplink OFDMA operation duration and timing for each uplink OFDMA packet. Each STA having traffic request will contend the resource based on a random access probability scheme.

Figure 2:
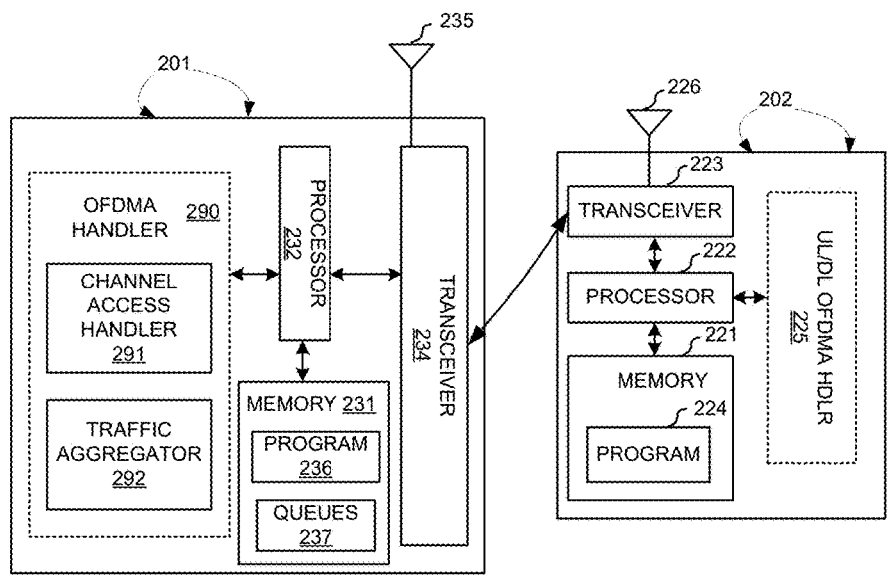
FIG. 2 illustrates an exemplary block diagram in a wireless system in accordance with embodiments of the current invention.

FIG. 2 illustrates an exemplary block diagram in a wireless system configured with OFDMA in accordance with embodiments of the current invention. Wireless communication station AP 202 has an antenna 226, which transmits and receives radio signals. A RF transceiver module 223, coupled with the antenna, receives RF signals from antenna 226, converts them to baseband signals and sends them to processor 222. RF transceiver 223 also converts received baseband signals from processor 222, converts them to RF signals, and sends out to antenna 226. Processor 222 processes the received baseband signals and invokes different functional modules to perform features in wireless communication station AP 202. Memory 221 stores program instructions and data 224 to control the operations of wireless communication station AP 202. Wireless communication station 202 also includes a set of control modules and circuits, such as uplink (UL)/downlink (DL) OFDMA handler 225 that handles tasks related to OFDMA handling in AP 202.

Similarly, wireless communication device STA 201 has an antenna 235, which transmits and receives radio signals. A RF transceiver module 234, coupled with the antenna, receives RF signals from antenna 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in wireless communication device STA 201. Memory 231 stores program instructions and data 236 and data queues 237 to control the operations of wireless communication device STA 201.

Wireless communication device STA 201 also includes a set of control modules and circuits that carry out functional tasks. An OFDMA handler 290 comprises both DL OFDMA handler and UL OFDMA handler. The DL OFDMA handler receives OFDMA data frames from a wireless communication station using a downlink wideband channel comprising a number of narrow sub-bands in a WLAN network. The UL OFDMA handler transmits OFDMA data frames to a wireless communication station using a narrow sub-band channel selected from an uplink wideband channel. The OFDMA handler 290 further comprises a channel access handler 291 for determining and updating random access probability for each OFDMA opportunity (e.g., following EDCA procedure), and a traffic aggregator 292 for aggregating data traffic from different AC queues to a single packet.

Figure 3:
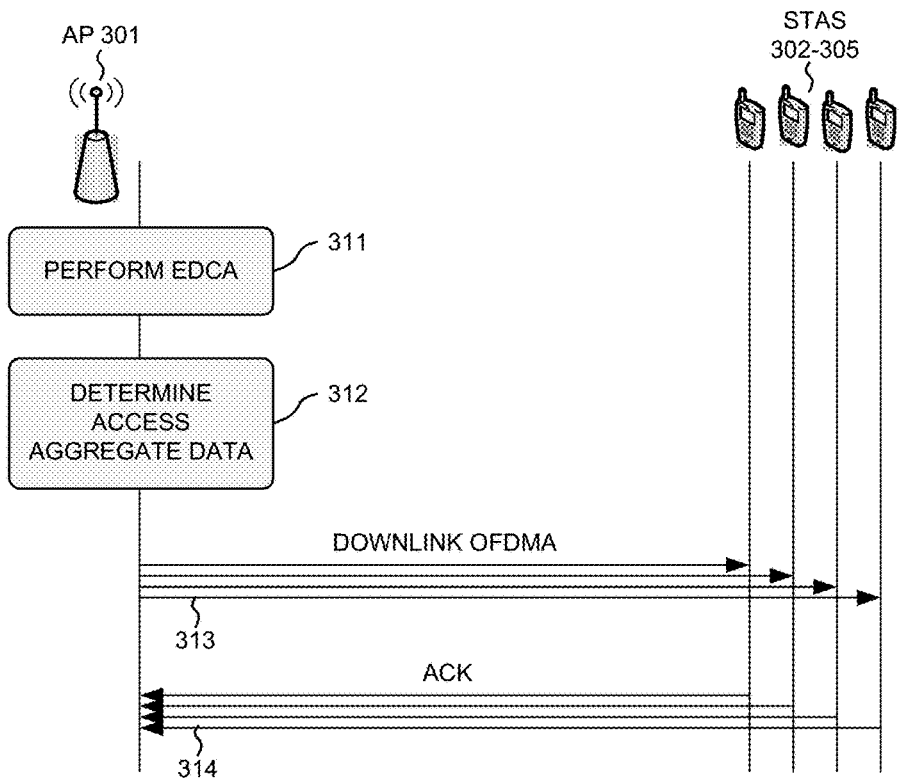
FIG. 3 illustrates an exemplary message flow of downlink OFDMA transmission with efficient OFDMA resource utilization by multiple AC allowance.

FIG. 3 illustrates an exemplary message flow of downlink OFDMA transmission with efficient OFDMA resource utilization by multiple AC allowance. In step 311, an access point AP 301 performs an EDCA channel contention procedure for the AP to gain access to the shared wireless medium, e.g., to obtain a transmitting opportunity (TXOP) for transmitting radio signals onto the shared wireless medium. If the wireless channel has been idle for a predetermined time, and an internal timer has expired (e.g., countdown to zero), then the AP has gained access to the wireless channel. In step 312, AP 301 determines access and prepares packets by aggregating data from different AC queues for each receiving wireless device. In step 313, AP 301 transmits the aggregated packets to a plurality of wireless communication devices STAs 302-305 using downlink OFDMA. In step 314, AP 301 receives acknowledgement from the STAs for the DL OFDMA.

Figure 4:
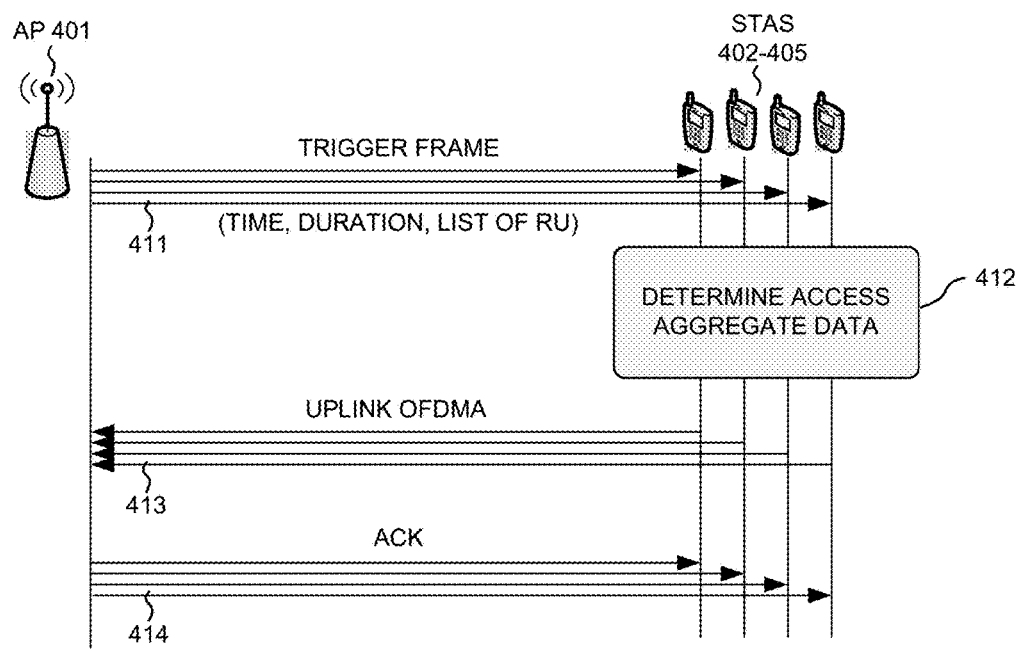
FIG. 4 illustrates an exemplary message flow of uplink OFDMA transmission with efficient OFDMA resource utilization by multiple AC allowance.

FIG. 4 illustrates an exemplary message flow of uplink OFDMA transmission with efficient OFDMA resource utilization by multiple AC allowance. In step 411, an access point AP 401 sends a trigger frame to a plurality of wireless communication devices STAs 402-405 for triggering uplink OFDMA. For a normal scheduled uplink OFDMA operation, an AP needs to collect the traffic requests from STAs, and arranging and managing dedicated the resource used for uplink OFDMA transmission. Alternatively, a contention-based uplink OFDMA transmission scheme can also be used. An AP reserves both dedicated resource and contention resource for uplink OFDMA operation. The AP needs to specify the allocated resource for random access and the uplink OFDMA operation duration and timing for each uplink OFDMA packet. In step 412, the STAs 402-405 determine channel access timing. For scheduled OFDMA, the timing is indicated by AP 401. For contention-based OFDMA, each STA having traffic request will contend the resource based on a random access probability scheme. Each STA then prepares packets by aggregating data from different AC queues for the receiving wireless communication station AP 401. In step 413, STAs 402-405 transmit the aggregated packets to AP 401 using uplink OFDMA. In step 414, AP 401 transmits an acknowledgement back to the STAs 403-405 for the UL OFDMA.

Figure 5:
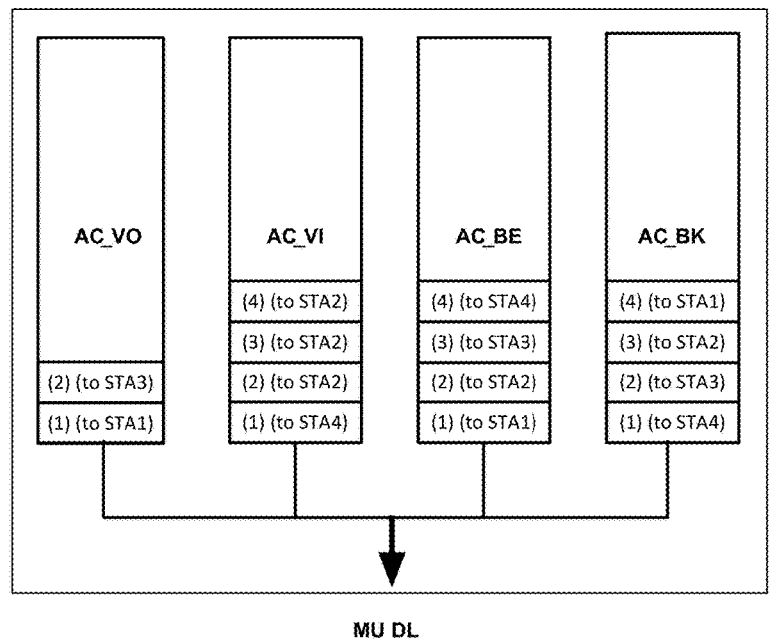
FIG. 5 illustrates one embodiment of downlink OFDMA with aggregation from multiple access categories with multiple AC TXOP sharing.
Figure 5:
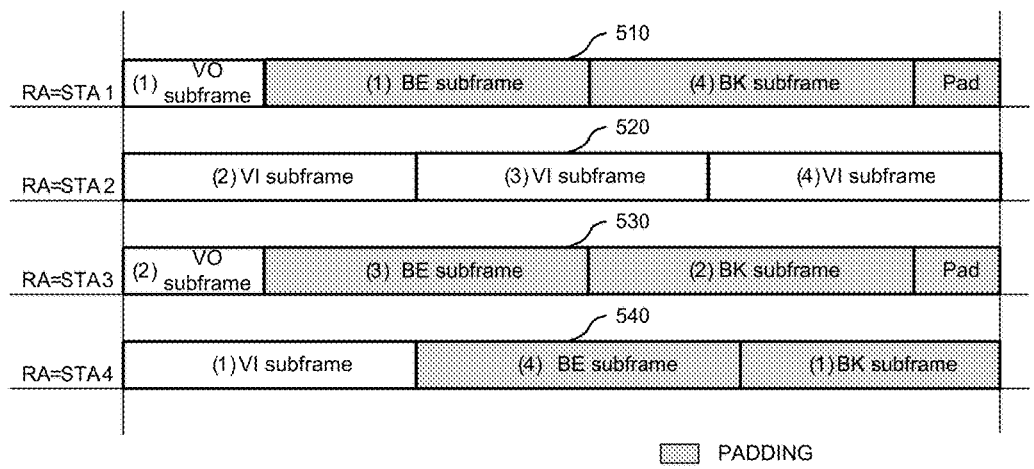

FIG. 5 illustrates one embodiment of downlink OFDMA with aggregation from multiple access categories with multiple AC TXOP sharing. In the example of FIG. 5, an AP has gained channel access with a TXOP for transmitting downlink OFDMA packets to a plurality of wireless devices STA1 to STA4. The AP has four data queues for storing data with different traffic types. The highest priority traffic type is mapped to voice AC_VO, the second-high priority traffic type is mapped to video AC_VI, the third-high priority traffic type is mapped to best effort AC_BE, and the lowest priority traffic type is mapped to background AC_BK. Each AC has its own EDCA parameters for performing random access and its own queue for storing the data. As depicted in FIG. 5, the AC_VO queue has data for STA1 and STA3; the AC_VI queue has data for STA4 and multiple data for STA2; the AC_BE queue has data for STA1, STA2, STA3, and STA4; and the AC_BK queue has data for STA4, STA3, STA2, and STA1.

For downlink OFDMA, all multi-user transmission timing needs to be aligned. As a result, idle time may happen for some DL resource units (RUs) and may require padding. In accordance with a novel aspect, the AP is allowed to aggregate data in subframes from different AC queues to form a single packet/frame to improve the utilization of the scheduled DL RUs. In the example of FIG. 5, for RA=STA1, the AP aggregates one VO subframe, one BE subframe, and one BK subframe from the different AC queues into a single PLCP service data unit PSDU 510; for RA=STA2, the AP aggregates three VI subframes from the AC_VI queue into a single PSDU 520; for RA=STA3, the AP aggregates one VO subframe, one BE subframe, and one BK subframe from the different AC queues into a single PSDU 530; for RA=STA4, the AP aggregates one VI subframe, one BE subframe, and one BK subframe from the different AC queues into a single PSDU 540. The aggregated PSDUs 510-540 are then transmitted to STA1-STA4 via DL OFDMA. In this example, the air time of the scheduled DL OFDMA RU is set by STA2 that requires the longest air time for the three VI subframes. Other STAs will and may have long idle time, e.g., padding may be required for STA1, STA3, and STA4 as depicted by the grey shade if no AC aggregation is allowed. By allowing aggregation from multiple AC queues, DL RU utilization is improved. Also, in downlink OFDMA, data to multiple destinations are allowed to be aggregated and transmitted in the same packet to utilize idle time efficiently.

Figure 6:
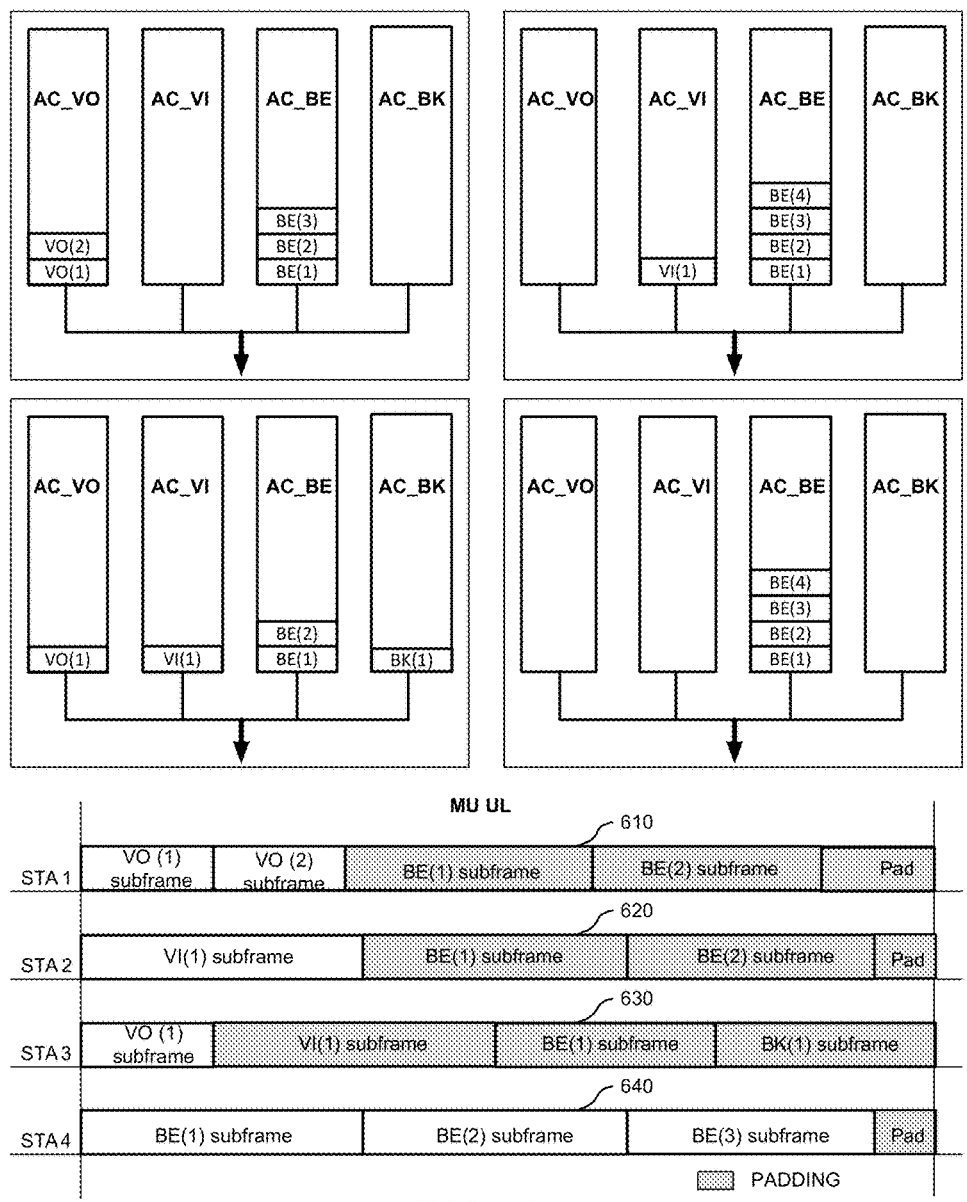
FIG. 6 illustrates one embodiment of uplink OFDMA with aggregation from multiple access categories with multiple AC TXOP sharing.

FIG. 6 illustrates one embodiment of uplink OFDMA with aggregation from multiple access categories with multiple AC TXOP sharing. In the example of FIG. 6, an AP has scheduled a plurality of wireless devices STA1 to STA4 for uplink OFDMA transmission during a TXOP. Each STA has four data queues for storing data with different traffic types. The highest priority traffic type is mapped to voice AC_VO, the second-high priority traffic type is mapped to video AC_VI, the third-high priority traffic type is mapped to best effort AC_BE, and the lowest priority traffic type is mapped to background AC_BK. Each AC has its own EDCA parameters for performing random access and its own queue for storing the data. As depicted in FIG. 6, STA1 has data stored in queues AC_VO and AC_BE; STA2 has data stored in queues AC_VI and AC_BE; STA3 has data stored in queues AC_VO, AC_VI, AC_BE, and AC_BK; and STA4 has data stored in queue AC_BE.

For uplink OFDMA, all multi-user transmission timing needs to be aligned. As a result, idle time may happen for some UL resource units (RUs) and may require padding. In accordance with a novel aspect, each STA is allowed to aggregate data in subframes from different AC queues to form a single packet/frame to improve the utilization of the scheduled UL RUs. In the example of FIG. 6, STA1 aggregates two VO subframe and one BE subframe from the different AC queues into a single PSDU 610; STA2 aggregates one VI subframe and two BE subframes from the different AC queues into a single PSDU 620; STA3 aggregates one VO subframe, one VI subframe, one BE subframe, and one BK subframe from the different AC queues into a single PSDU 630; STA4 aggregates three BE subframes from the AC_BE queue into a single PSDU 640. The aggregated PSDUs 610-640 are then transmitted to the AP via UL OFDMA. In this example, the air time of the scheduled UL OFDMA RU is set by STA4 that requires the longest air time for the three BE subframes. Other STAs will and may have long idle time, e.g., padding may be required for STA1, STA2, and STA3 as depicted by the grey shade if no AC aggregation and TXOP sharing is allowed. By allowing aggregation from multiple AC queues for each STA, UL RU utilization is improved.

Figure 7:
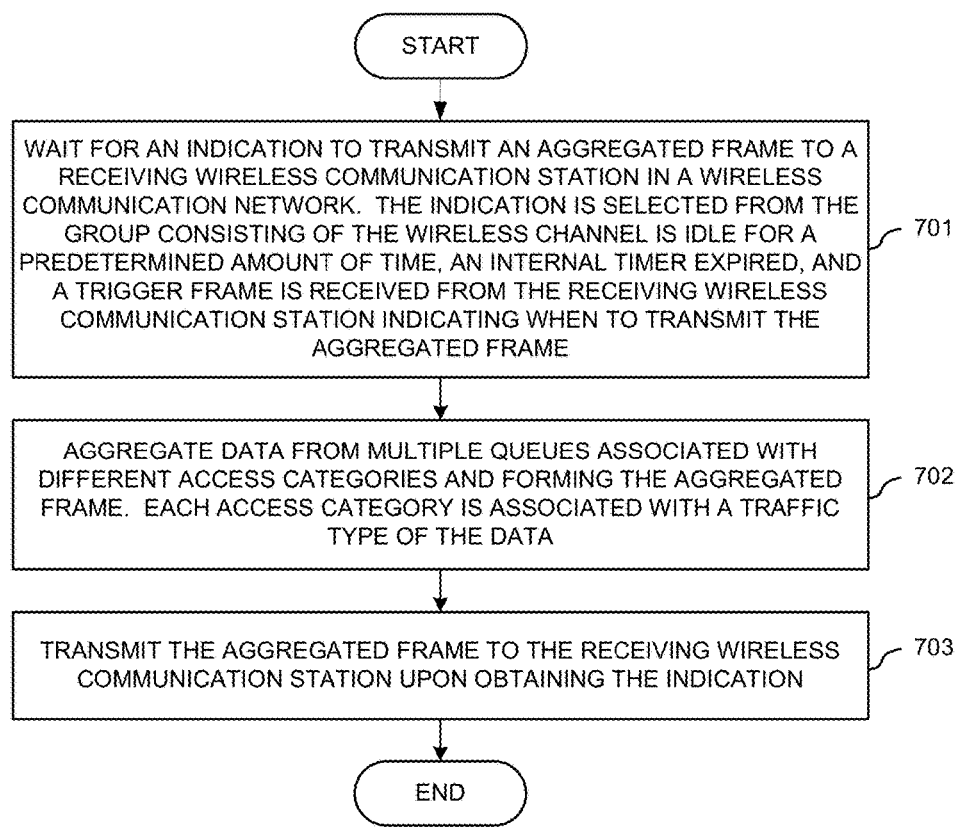
FIG. 7 is a flow chart of a method of performing transmission with aggregation from multiple access categories in accordance with one novel aspect.

FIG. 7 is a flow chart of a method of performing transmission with aggregation from multiple access categories to improve channel utilization of a wireless channel in accordance with one novel aspect. In step 701, a transmitting wireless communication station waits for an indication to transmit an aggregated frame to a receiving wireless communication station in a wireless communication network. The indication is selected from the group consisting of the wireless channel is idle for a predetermined amount of time, an internal timer expired, and a trigger frame is received from the receiving wireless communication station indicating when to transmit the aggregated frame. In other embodiments, the indication can be decided by combining two or all of the indications listed. In step 702, the transmitting wireless communication station aggregates data from multiple queues associated with different access categories and forming the aggregated frame. Each access category is associated with a traffic type of the data. In step 703, the transmitting wireless communication station transmits the aggregated frame to the receiving wireless communication station upon obtaining the indication.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of wireless communication, the method comprising:
    a first wireless communication device gaining a multi-user (MU-) transmitting opportunity (TXOP) for transmitting packets to a plurality of wireless communication devices by Orthogonal Frequency Demodulation Multiple Access (OFDMA) transmission, wherein a respective resource unit (RU) is scheduled to each of said plurality of wireless communication devices;
    said first wireless communication device generating a set of packets, wherein said generating comprises aligning transmission timing of RUs scheduled for said set of packets, and wherein further said aligning comprises aggregating data from multiple access categories into a respective packet of said set of packets; and
    transmitting said set of packets from said first wireless communication device for said plurality of wireless communication devices respectively in said MU-TXOP using OFDMA transmission,
    wherein said aggregating further comprises:
        determining an idle air time of an RU in said MU-TXOP based on existent data in said respective packet, wherein said RU is scheduled for transmitting said respective packet; and
        based on said idle air time, adding data of an access category different than said existent data to said respective packet.

2. The method of claim 1, wherein said aligning further comprises adding padding to said respective packet.

3. The method of claim 1 further comprising maintaining a data queue for each of a set of access categories, and wherein said aggregating comprises accessing said data from corresponding data queues for said set of access categories.

4. The method of claim 3, wherein each access category of said set of access categories corresponds to a priority level with respect to an enhanced distributed channel access (EDCA) process that is used for channel contention.

5. The method of claim 3, wherein each access category of said set of access categories corresponds to class of service priority level, and wherein further said set of access categories comprises categories of voice data, video data, best effort data and background data.

6. The method of claim 1, wherein said gaining said MU-TXOP comprises receiving an indication that a wireless channel has been idle for a predetermined time or that an internal timing has expired, and wherein said MU-TXOP is a downlink transmission opportunity.

7. A method of wireless communication performed by a first wireless communication device, the method comprising:
    receiving a message from an access point device, wherein said message instructs said first wireless communication device to perform an uplink transmission by Orthogonal Frequency Demodulation Multiple Access (OFDMA) during a multi-user (MU-) transmitting opportunity (TXOP), and wherein said message further indicates: a resource unit (RU) for said first wireless communication device; and scheduled transmission timing of said RU in said MU-TXOP, wherein said transmission timing of said RU is aligned with transmission timing of other RUs in said transmission timing of said RU;
    generating a packet, wherein said generating comprises:
        based on said scheduled transmission timing of said RU, determining an idle air time of said RU in said MU-TXOP based on existent data in said packet; and
        based on said idle air time, aggregating data of an access category different than said existent data to said packet, and
    transmitting said packet to said access point device in said MU-TXOP by OFDMA transmission.

8. The method of claim 7, wherein said generating further comprises adding padding to said packet.

9. The method of claim 7 further comprising maintaining a data queue for each of a set of access categories, and wherein said aggregating comprises accessing said data from corresponding data queues for said set of access categories.

10. The method of claim 9, wherein each access category of said set of access categories corresponds to a priority level with respect to an enhanced distributed channel access (EDCA) process that is used for channel contention.

11. The method of claim 9, wherein each access category of said set of access categories corresponds to class of service priority level.

12. The method of claim 9, wherein said set of access categories comprise categories of voice data, video data, best effort data and background data.

13. A wireless communication device comprising:
a transceiver;
a memory; and
a processor coupled to said transceiver and said memory, wherein said processor is configured to:
gain a multi-user (MU-) transmitting opportunity (TXOP) for transmitting packets to a plurality of wireless communication devices by OFDMA transmission, wherein a respective resource unit (RU) is scheduled for each of said plurality of wireless communication devices;
generate a set of packets, wherein generating said set of packets comprises aligning transmission timing of RUs scheduled for said set of packets, and wherein further said aligning comprises aggregating data from multiple access categories into a respective packet of said set of packets; and
transmit said set of packets from to said plurality of wireless communication devices respectively in said MU-TXOP by OFDMA, transmission,
wherein said aggregating further comprises:
determining an idle air time of an RU in said MU-TXOP based on existent data in said respective packet, wherein said RU is scheduled for transmitting said respective packet; and
based on said idle air time, adding data of an access category different than said existent data to said respective packet.

14. The wireless communication device of claim 13, wherein said processor is further configured to add padding to said respective packet.

15. The wireless communication device of claim 13, wherein said processor is further configured to maintain a data queue for each of a set of access categories, and wherein said aggregating comprises accessing said data from corresponding data queues for said set of access categories.

16. The wireless communication device of claim 15, wherein each access category of said set of access categories corresponds to a priority level with respect to an enhanced distributed channel access (EDCA) process that is used for channel contention.

17. The wireless communication device of claim 15, wherein each access category of said set of access categories corresponds to class of service priority level, and wherein further said set of access categories comprise categories of voice data, video data, best effort data and background data.

18. The wireless communication device of claim 13, wherein said processor is further configured to receive indication that a wireless channel has been idle for a predetermined time or that an internal timing has expired, and wherein said MU-TXOP is a downlink transmission opportunity.

* * * * *